United States Patent

Eidelman

(10) Patent No.: US 10,162,665 B1
(45) Date of Patent: Dec. 25, 2018

(54) HYPERVISOR ASSISTED CONTROL OF CPU ACCESS TO EXTERNALLY MANAGED PHYSICAL MEMORY

(71) Applicant: Marvell International LTD., Hamilton (BM)

(72) Inventor: Anton Eidelman, Palo Alto, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 208 days.

(21) Appl. No.: 15/214,822

(22) Filed: Jul. 20, 2016

Related U.S. Application Data

(60) Provisional application No. 62/200,258, filed on Aug. 3, 2015.

(51) Int. Cl.
  *G06F 13/24* (2006.01)
  *G06F 13/32* (2006.01)
  *G06F 9/455* (2018.01)

(52) U.S. Cl.
  CPC .......... *G06F 9/45558* (2013.01); *G06F 13/24* (2013.01); *G06F 2009/45583* (2013.01)

(58) Field of Classification Search
  CPC .............................. G06F 9/45558; G06F 13/24
  USPC .......................................................... 710/267
  See application file for complete search history.

(56) References Cited

U.S. PATENT DOCUMENTS

| | | | | |
|---|---|---|---|---|
| 7,373,640 B1* | 5/2008 | English | ................... | G06F 8/456 |
| | | | | 712/203 |
| 7,987,464 B2* | 7/2011 | Day | ..................... | G06F 9/5077 |
| | | | | 710/260 |
| 8,275,971 B2* | 9/2012 | Franke | ................ | G06F 12/1027 |
| | | | | 711/207 |
| 9,152,571 B2* | 10/2015 | Kegel | ................ | G06F 12/1027 |

* cited by examiner

*Primary Examiner* — Chun Kuan Lee

(57) ABSTRACT

A memory management module receives a request to access a page in a memory, sends the request to a memory controller controlling the memory if the page is available in the memory, and if the page is unavailable, (i) does not send the request to the memory controller, and (ii) generates a first exception. A hypervisor intercepts the first exception and sends a second exception to an operating system. The operating system includes a handler to, in response to the second exception, selectively request the memory controller to obtain the page from a storage device into the memory, and to suspend execution of a first thread issuing the request on a processor until the page becomes available in the memory; and a kernel to schedule execution of a second thread on the processor until the page becomes available, or to idle the processor until the page becomes available.

12 Claims, 12 Drawing Sheets

| # | CPU | Option | Description |
|---|---|---|---|
| 1 | Issuing CPU | 1a, 1b | Read: stall shortly due to dependency |
| 2 | Issuing CPU | 1a, 1b | Write: stall on next barrier |
| 3 | Issuing CPU | 1a | Stall on next RAM access (cache miss) |
| 4 | Issuing CPU | 1b | Stall when issue limit is reached |
| 5 | Other CPU | 1a | Stall on next RAM access (cache miss) |
| 6 | Other CPU | 1b | Does not stall until MC transaction buffering capability is reached. |

FIG. 2B

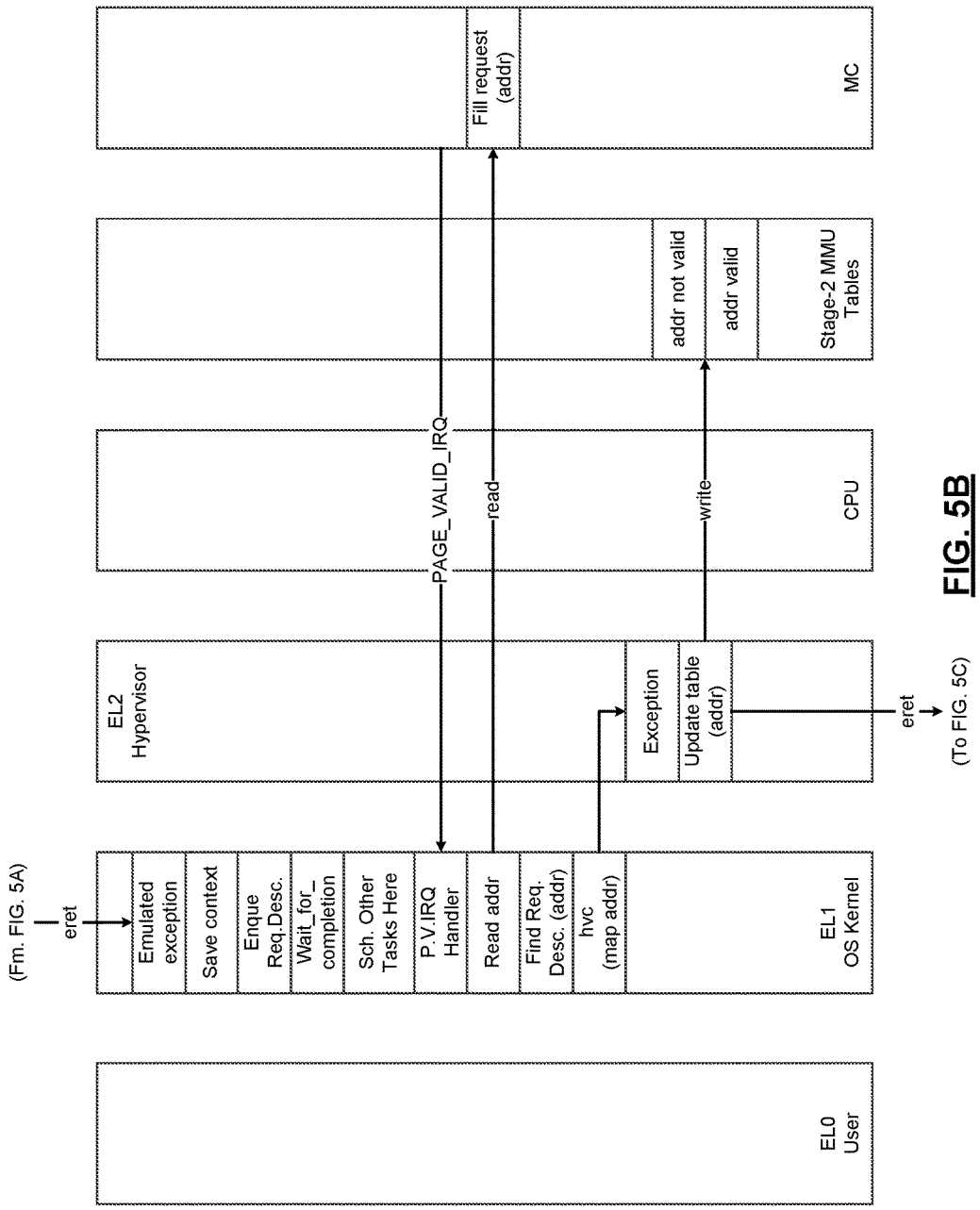

HYPERVISOR ASSISTED CONTROL OF CPU ACCESS TO EXTERNALLY MANAGED PHYSICAL MEMORY

CROSS-REFERENCE TO RELATED APPLICATIONS

This application claims the benefit of U.S. Provisional Application No. 62/200,258, filed on Aug. 3, 2015. The entire disclosure of the application referenced above is incorporated herein by reference.

FIELD

The present disclosure relates to hypervisor assisted control of CPU access to externally managed physical memory.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Computing systems such as personal computers, laptop computers, servers, and mobile devices such as smart phones and tablets use one or more processors (central processor units or CPUs), a main memory (also called system memory) generally in the form of random access memory (RAM), and one or more peripheral storage devices (e.g., a hard disk drive or a flash drive). The processor employs a memory management system that swaps data between the main memory and the peripheral storage device. For example, the memory management system retrieves data needed for processing by the processor from the peripheral storage device into the main memory and transfers processed data from the main memory to the peripheral storage device.

SUMMARY

A system comprises a memory management module and a hypervisor. The memory management module is configured to receive a request to access a page in a memory. In response to the page being available in the memory, the memory management module is configured to send the request to a memory controller controlling the memory. In response to the page being unavailable in the memory, the memory management module is configured to (i) not send the request to the memory controller, and (ii) generate a first exception. The hypervisor is configured to intercept the first exception and send a second exception to an operating system. The operating system includes a handler and a kernel. The handler is configured to, in response to the second exception, selectively request the memory controller to obtain the page from a storage device into the memory, and suspend execution of a first thread issuing the request on a processor until the page becomes available in the memory. The kernel is configured to schedule execution of a second thread on the processor until the page becomes available, or idle the processor until the page becomes available.

In other features, in response to the page becoming available in the memory, the memory controller is further configured to generate an interrupt. In response to the interrupt, the kernel is further configured to generate a hypervisor call. In response to the hypervisor call, the hypervisor is further configured to update status of the page as being available. In response to the updated status of the page indicating the page is available, the kernel is further configured to resume execution of the first thread issuing the request, and the memory management module is further configured to send the request to the memory controller.

In other features, the memory controller is further configured to generate an interrupt prior to evicting a second page from the memory to the storage device. In response to the interrupt, the kernel is further configured to generate a hypervisor call. In response to the hypervisor call, prior to the second page becoming unavailable, the hypervisor is further configured to update status of the second page as being unavailable and clean a cache of the processor to obviate access to the second page after the second page becomes unavailable.

In other features, the handler is further configured to request the memory controller to obtain the page from the storage device into the memory in response to the page storing valid data and not request the memory controller to obtain the page from the storage device into the memory in response to the page storing irrelevant data.

In other features, in response to the page storing irrelevant data, the memory controller is further configured to make the page available by populating the page with null data.

In other features, in response to the memory management module deallocating a second page, the hypervisor is further configured to designate the second page (i) as being unavailable and (ii) as storing data not in use.

In other features, in response to the hypervisor designating the second page as storing data not in use, the memory controller is further configured to not evict the second page from the memory to the storage device.

In still other features, a method comprises receiving, by a memory management module, a request to access a page in a memory. The method further comprises sending, by the memory management module, the request to a memory controller controlling the memory in response to the page being available in the memory. The method further comprises in response to the page being unavailable in the memory, (i) not sending, by the memory management module, the request to the memory controller and (ii) generating, by the memory management module, a first exception. The method further comprises intercepting, by a hypervisor, the first exception and sending, by the hypervisor, a second exception from the hypervisor to an operating system. The method further comprises in response to the second exception, selectively requesting, by a handler of an operating system, the memory controller to obtain the page from a storage device into the memory and suspending, by the handler, execution of a first thread issuing the request on a processor until the page becomes available in the memory. The method further comprises scheduling, by a kernel of the operating system, execution of a second thread on the processor until the page becomes available or idling, by the kernel, the processor until the page becomes available.

In other features, the method further comprises generating, by the memory controller, an interrupt in response to the page becoming available in the memory. The method further comprises generating, by the kernel, a hypervisor call in response to the interrupt. The method further comprises updating, by the hypervisor, status of the page as being available in response to the hypervisor call. The method further comprises in response to the updated status of the page indicating the page is available, resuming, by the kernel, execution of the first thread issuing the request and sending, by the memory management module, the request to the memory controller.

In other features, the method further comprises generating, by the memory controller, an interrupt prior to evicting a second page from the memory to the storage device. The method further comprises generating, by the kernel, a hypervisor call in response to the interrupt. The method further comprises in response to the hypervisor call, prior to the second page becoming unavailable, updating, by the hypervisor, status of the second page as being unavailable and cleaning, by the hypervisor, a cache of the processor to obviate access to the second page after the second page becomes unavailable.

In other features, the method further comprises requesting, by the handler, the memory controller to obtain the page from the storage device into the memory in response to the page storing valid data. The method further comprises not requesting, by the handler, the memory controller to obtain the page from the storage device into the memory in response to the page storing irrelevant data.

In other features, the method further comprises making, by the memory controller, the page available by populating the page with null data in response to the page storing irrelevant data.

In other features, the method further comprises designating, by the hypervisor, in response to the memory management module deallocating a second page, the second page (i) as being unavailable and (ii) as storing data not in use.

In other features, the method further comprises in response to designating, by the hypervisor, the second page as storing data not in use, not evicting, by the memory controller, the second page from the memory to the storage device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 2B shows implications of long response times when an unavailable page is accessed by a processor of the CPU subsystem of FIG. 2A.

FIGS. 5A-5C depict fault handling using the hypervisor of FIG. 4.

In the drawings, reference numbers may be reused to identify similar and/or identical elements.

DESCRIPTION

The present disclosure relates to controlling CPU (software) access to physical memory (RAM), which is externally managed (e.g., by a memory controller (MC)), and which can expose the system to arbitrarily long access times on certain memory accesses. In a trivial approach, the fact that physical RAM (and backup storage device (e.g., hard disk drive or flash drive)) is externally managed (e.g., by a memory controller (MC) is transparent to software. As RAM access is usually assumed to have predictable and short response time, externally managed RAM exposes the CPU and software to significant unpredictable delays. This may result in both severe performance degradation and malfunctions.

The proposed design solves this problem and provides additional capabilities to minimize the impact on the system and manage the external memory. The proposed design can be used in smart-phones and may be applicable to any other computer system with similar external memory features, for example, distributed systems with emulated shared memory over network.

In the proposed design, when at least part of the system memory (RAM) is managed by a memory controller (MC) and a block/page of the RAM might appear unavailable thus imposing long access latencies, a stage-2 memory management unit (MMU) translation can be used to reflect these page states. The memory controller communicates the state changes to the software (OS) using interrupts. The software access to an unavailable page is trapped into (intercepted by) a hypervisor as a stage-2 fault, which prevents the ill effects of long latency access to the page (CPU stalling). Instead, the page is requested using a control channel to the memory controller (MC registers), and the thread that issued the access can be suspended using the hypervisor and the OS kernel. The CPU remains available to perform other tasks while the request is being handled by the hypervisor. Additionally, the design allows tracking the usage of RAM pages to distinguish between pages with relevant contents that need to be restored and pages that can be cleared when accessed, which further reduces the latency. Additionally, the design allows emulation of externally managed RAM on a live system with a memory controller without final level cache (FLC) capability to perform tuning, measurements, software development, and optimization. These and other aspects of the present disclose are described below in detail.

The present disclosure references ARM processors for illustrative purposes only. The present disclosure is not limited to ARM architecture. The teachings of the present disclosure can be applied to and implemented by any processor.

Figure 1:
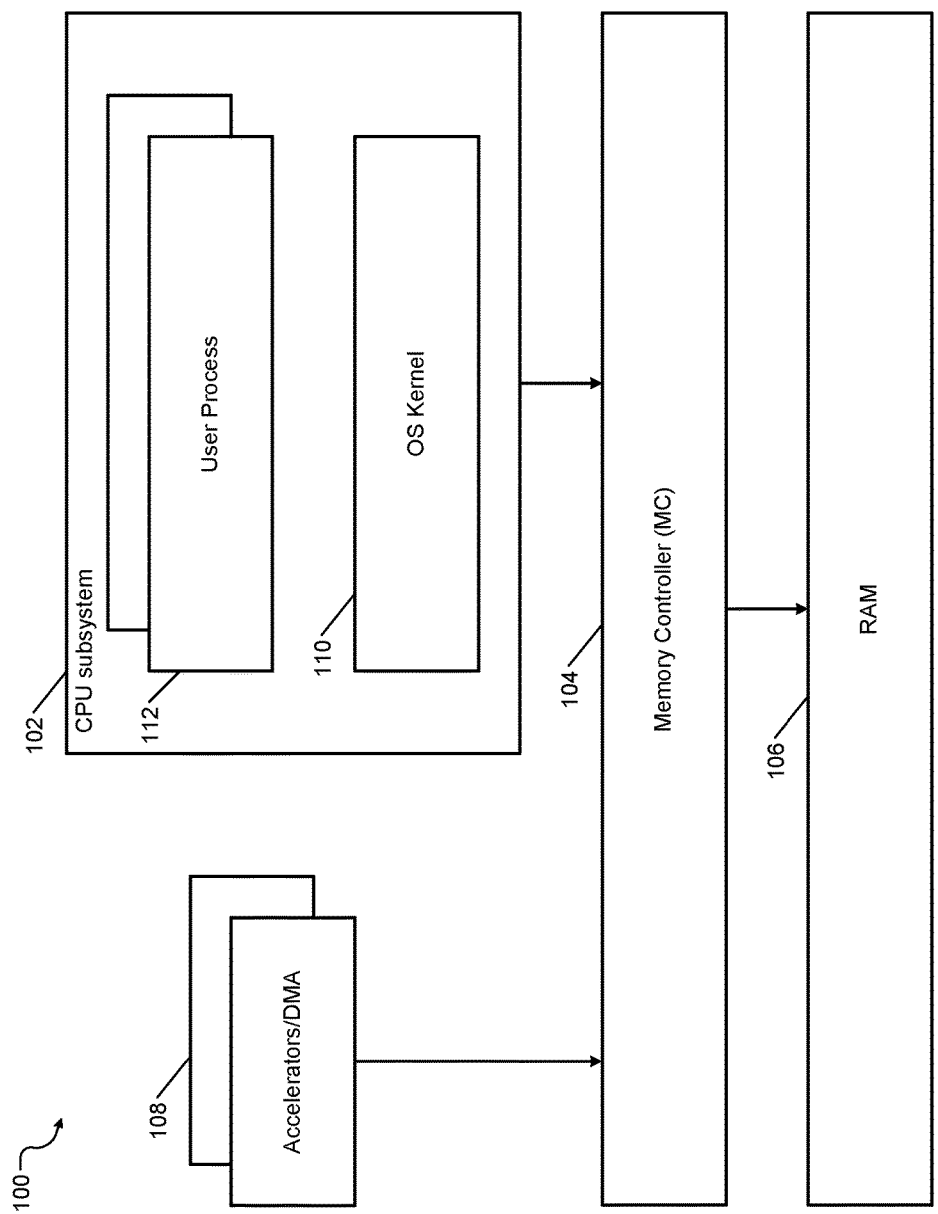
FIG. 1 depicts an example of a computing system including a CPU subsystem, a memory controller, and memory.

FIG. 1 shows a system 100 including a CPU subsystem 102, a memory controller (MC) 104, a random access memory (RAM) 106, and one or more direct memory access (DMA) capable non-CPU Masters (e.g., a graphics processor unit (GPU), various accelerators, and peripherals) (or simply elements) 108. The CPU subsystem (or simply CPU) 102 may include a multiprocessor complex that executes software including an operating system (OS) kernel 110 and one or more applications (user processes) 112. The RAM (also called physical memory) 106 may include a double data rate (DDR) memory, for example. The RAM 106 serves as the main memory (system memory) of the CPU subsystem 102. The CPU subsystem 102 and other DMA capable hardware modules (e.g., elements 108) issue accesses (reads/writes) to the physical memory 106 (e.g., ARM Advanced Extensible Interface (AXI) transactions) that are received and handled by the memory controller 104.

In a traditional system, any access to the physical memory 106 is completed and responded on within a predictable and quite narrow time range that depends on relevant clock frequencies, memory configuration, and amount of traffic to the physical memory 106 at the moment. Accordingly, the software considers the entire physical memory 106 as uniformly available. The physical memory 106 is allocated (typically by the OS kernel 110), and the software accesses the allocated memory freely and directly while expecting predictable access time. This design applies to systems with externally managed physical memory 106, for example, by the memory controller 104 implementing a final level cache (FLC) technology (page swapping to a slower medium (e.g., a hard disk drive or flash drive)).

Figure 2A:
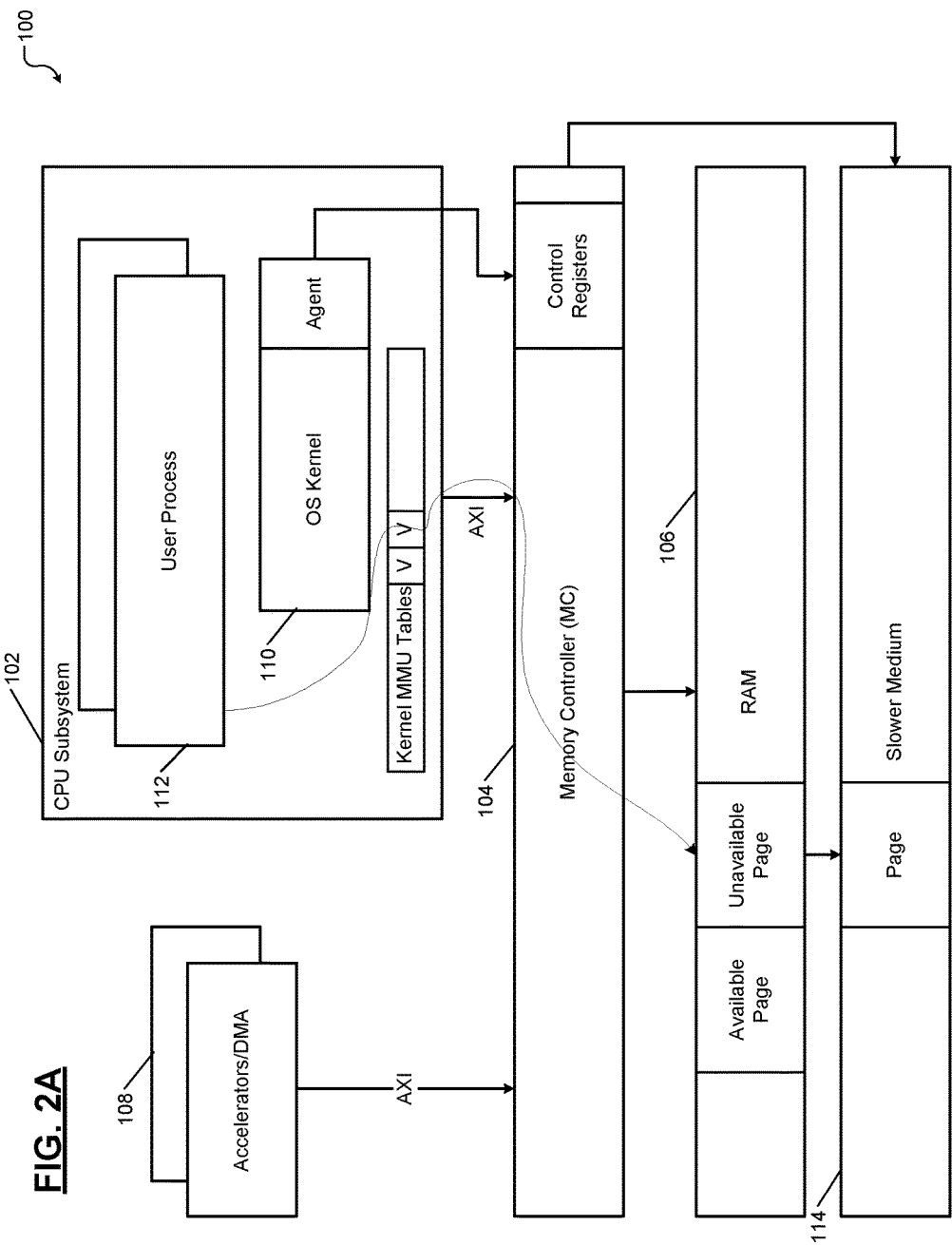
FIG. 2A depicts an example of the computing system of FIG. 1 further including a storage device.

FIG. 2A shows the system 100 further including a slower medium (e.g., a hard disk drive or flash drive) (or simply a storage device) 114, which has slower access times than the physical memory 106. In such a system, part or all of the physical memory 106 is subject to memory management as follows. The physical memory 106 is divided into blocks called pages. Each page can be in one of two states at a time: available (resulting in a hit on access) or unavailable (resulting in a miss on access). An access to an available page is handled as in a traditional system and has a predictable response time (e.g., 100 ns). An access to an unavailable page initiates a state transition that might take a relatively long time (e.g., 1 ms). The access to an unavailable page cannot be responded on normally until the transition from unavailable to available state is complete.

The hardware (e.g., the memory controller 104) implements a control channel that allows the software to initiate page state transitions in advance and without accessing the page directly. Page transition to an available state occurs due to access by any of the masters (e.g., a processor in the CPU subsystem 102 or element 108) or an explicit request issued to the memory controller 104 via the control channel. Page transition to an unavailable state occurs due to page replacement (eviction from the memory 106 to the slower medium 114) by the memory controller 104 or an explicit request issued to the memory controller 104 via the control channel.

A typical CPU architecture and memory interface (e.g., ARM architecture (see ARM DDI 0487a-f)) such as that shown in FIGS. 1 and 2A assumes that accesses to the physical memory 106 are error free and have uniform response time. Unlike device (non-memory) accesses, normal memory accesses are managed by a memory interface of the CPU subsystem 102 to optimize performance. For example, the accesses are loosely ordered, subject to caching in the CPU internal caches, speculative accesses, etc. Most of the space in the physical memory 106 is defined as normal memory in a processor's memory management unit (MMU) to achieve best performance. Multiple outstanding (MO) accesses to the normal memory can be issued to the memory controller 104 before previous accesses have been responded (up to an issue limit of the CPU 102, cluster, or interconnect).

The memory controller 104 responds to a transaction with a normal response (OKAY) when completed or with an error response (e.g., SLV_ERR). An error response may generate an external exception to the CPU 102 (serror on ARMv8) or an interrupt. In ARM architecture, errors on normal memory accesses are not recoverable (resulting in loss of state) at least in some cases because such errors are assumed to be rare and fatal events. For example, on ARM Cortex A53 MPCore, errors on cacheable writes are reported as imprecise (do not map to a specific CPU instruction), and errors on eviction from CPU caches are reported as interrupts and result in loss of cache line contents that failed to be written to the external memory.

The heterogeneous nature of physical memory 106 is not visible to memory management (MM) of the OS kernel 110, which is based on the assumptions described above. Specifically, the OS memory management assumes that it is safe to map any of the physical RAM pages in the MMU, which allows direct access to these pages. Multiple (potentially, hundreds of) processes may reference and map a physical page (e.g., one belonging to a shared library etc.). The process of removing references to a page (called rmap in ARM architecture) requires modifications to all the involved per-process MMU tables and is therefore expensive.

In the software transparent approach, any normal memory access from the CPU subsystem 102 is issued to the memory controller 104 (e.g., via AXI transaction in ARM architecture). If the page being accessed is unavailable, the memory controller 104 performs one of the following actions:
1. Hold the response until the page state changes and access can be responded.
    a) Stall the AXI port until the transaction can be responded. Since CPUs in the CPU subsystem 102 typically share one AXI channel to the memory controller 104, this prevents the entire CPU subsystem 102 from issuing any further accesses to the physical memory 106.
    b) Buffer the transaction and allow further accesses (due to Multiple outstanding (MO) accesses). This requires extensive buffering capability to accommodate, subject to maximal issue capability (limit).
2. Issue an error response. This results in loss of state and is likely fatal, which is not acceptable.

Only options 1a and 1b are viable. FIG. 2B shows the implications of the long response time when an unavailable page is being accessed by one of the CPU's in the CPU subsystem 102. As FIG. 2B shows, an access to an unavailable page likely stalls the entire CPU subsystem 102, including in option 1b, considering the software often issues a sequence of accesses to adjacent locations in memory, (e.g., bulk transfers done by memcpy( ) or memset( ) type of operations in ARM architecture).

As described above, an access to an unavailable page stalls at least the issuing CPU until the access is completed. While it is unavoidable with respect to the thread that issued the access and needs its completion in order to continue, the consequences have significant impact on overall system performance and power. For example, while the current thread cannot continue, the CPU it was running on could perform other tasks. However, as the CPU is stalled, there is no way to schedule another thread(s) on this CPU. Moreover, there is no way to idle the CPU in this case. The natural way to do so would be to perform re-scheduling and potentially idle the CPU if no other thread is runnable. Accordingly, the stalled CPU(s) cannot perform any useful work and cannot idle to save power.

Further, as a page can be evicted (transitioned to an unavailable state) asynchronously, it is possible that the CPU subsystem caches still hold a dirty cache line mapped to this physical page. Such a cache line eventually will be evicted from the CPU cache and result in access to the page now unavailable. Consequently, the page will have to transition back to the available state although it is unlikely to be used in the near future, with undesired side effects, e.g., an eviction of another page.

Figure 3:
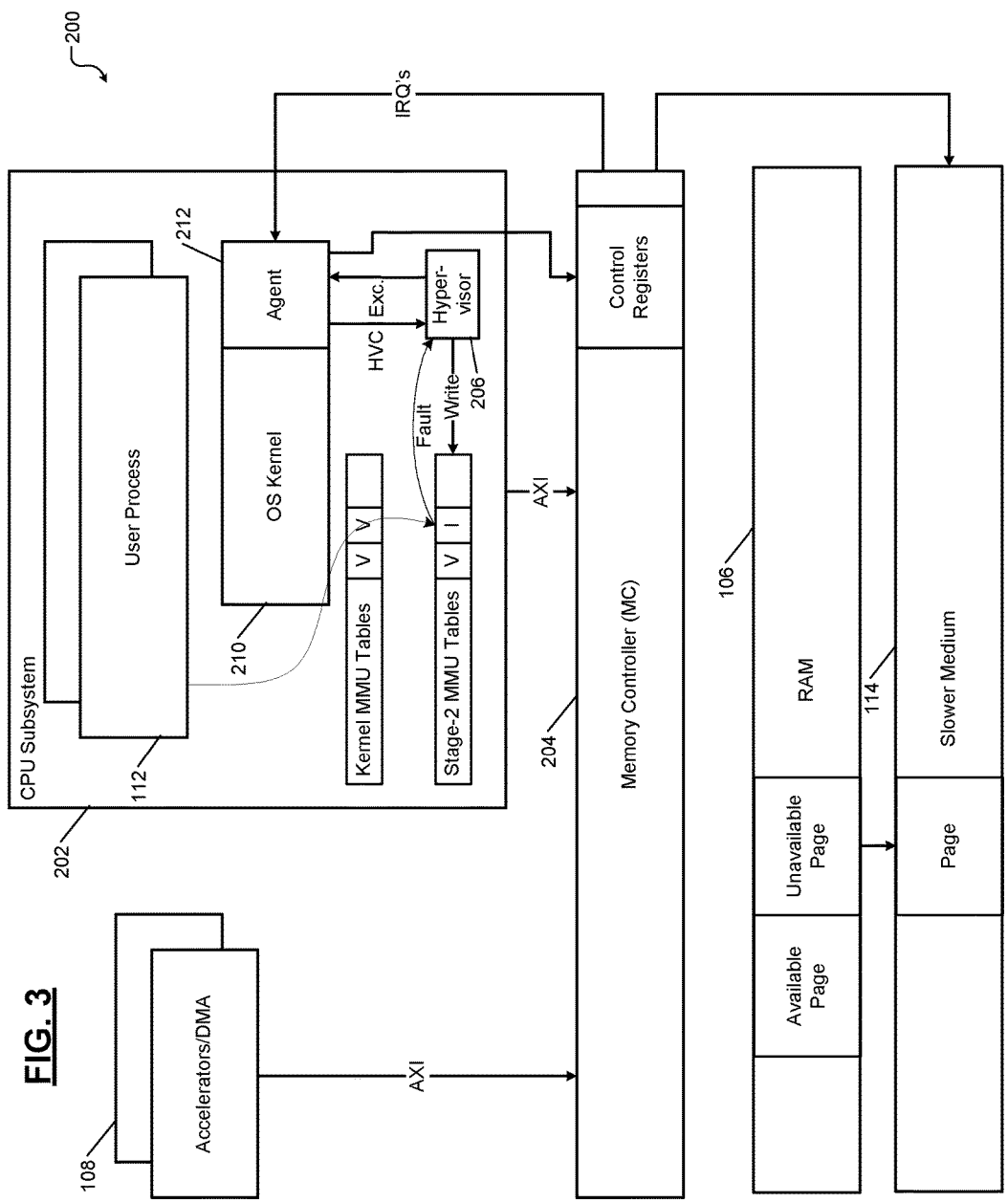
FIG. 3 depicts an example of a computing system including a CPU subsystem comprising a hypervisor and further including a memory controller, memory, and a storage device.

FIG. 3 shows a system 200 according to the present disclosure that eliminates the unwanted effects described above by preventing the CPU subsystem from directly accessing any unavailable pages. The system 200 includes a CPU subsystem (or simply CPU) 202, a memory controller 204, the RAM 106, the elements 108, and the storage device 114. The CPU subsystem 202 may include a multiprocessor complex that executes software including an operating system (OS) kernel 210 and one or more applications (user processes) 112. The CPU subsystem 202 additionally includes a hypervisor 206.

The system 200 prevents the CPU subsystem 202 from directly accessing any unavailable pages by reflecting page states in MMU stage-2 translation tables. Stage-2 translation is available on CPUs with virtualization extensions (e.g., ARM v7 and v8 architecture CPU's). Stage-2 translation is transparent to the OS software and is controlled by the hypervisor 206. Stage-2 translation tables in this approach "map" input address (IPA) to the same output address (PA), while the page state is reflected in corresponding MMU descriptors by setting the translations to valid (available pages) or invalid (unavailable page). A CPU access to an available page passes translation and is issued to the memory controller 204. A CPU access to an unavailable page fails translation and a synchronous stage-2 fault exception is generated by the CPU 202. The fault exception is handled by the hypervisor 206. The hypervisor 206 and an agent (a handler separate from a page swapping handler) 212 in the OS kernel 210 collaborate to request pages on access. Additionally, the hypervisor 206 and the handler 212 monitor page states using interrupt requests (IRQs) signaled by the memory controller 204, update the stage-2 translation tables accordingly, and suspend/resume OS tasks that need access to currently unavailable pages.

In ARM architecture, for example, stage-2 translation affects only non-secure state software (typically, the full-featured OS and system execute in this state). The secure software bypasses stage-2 translations and is therefore not covered (not protected). However, secure software is not expected to use externally managed RAM for performance and security reasons.

Further, only the CPU subsystem 202 is covered as stage-2 translation exists within the CPU(s) and does not affect interaction between other masters (e.g., elements 108) and the memory controller 204. The other masters, however, are not considered at risk due to possible unavailable page accesses for the following reasons. Memory used by accelerators is not designated to be externally managed RAM. Often accelerators cannot tolerate access delays due to unavailable page accesses. The software running on CPUs can ensure that the pages to be accessed by an accelerator are available before the accelerator can access them.

While additional RAM is needed to hold the stage-2 MMU tables, the amount of additional RAM is a small percentage of the total RAM size. For example, with 4 KB pages, the stage-2 MMU tables use 0.2% of the RAM; and with 16 KB pages, the stage-2 MMU tables use 0.05% of the RAM.

In one embodiment, to minimize changes to system software, the hypervisor 206 is only assigned functions that other components cannot handle. Specifically, the hypervisor 206 does not handle any IRQs because the OS kernel 210 normally handles IRQs in the system 200.

The functions performed by the hypervisor 206 include the following. The hypervisor 206 handles stage-2 fault exceptions; updates stage-2 MMU tables and performs appropriate cache and translation lookaside buffer (TLB) maintenance, where a TLB is a cache that memory management uses to improve virtual address translation speed; and emulates (generates) an exception to the OS kernel 210 in order to notify on access fault.

The functions performed by the OS kernel 210 include the following. The OS kernel 210 handles IRQ's generated by the memory controller 204; handles the emulated exceptions (generated by the hypervisor 206), requests page access from the memory controller 204, and suspends the current thread of execution; keeps track of the pages requested; handles the memory controller 204 IRQ that notifies on page transition to available state (PAGE_VALID), notifies the hypervisor 206 via a hypervisor call (HVC), and resumes the relevant suspended threads of execution; and handles the memory controller 204 IRQ that notifies on page transition to unavailable state (PAGE_ INVALID), and informs the hypervisor via a hypervisor call (HVC).

Figure 4:
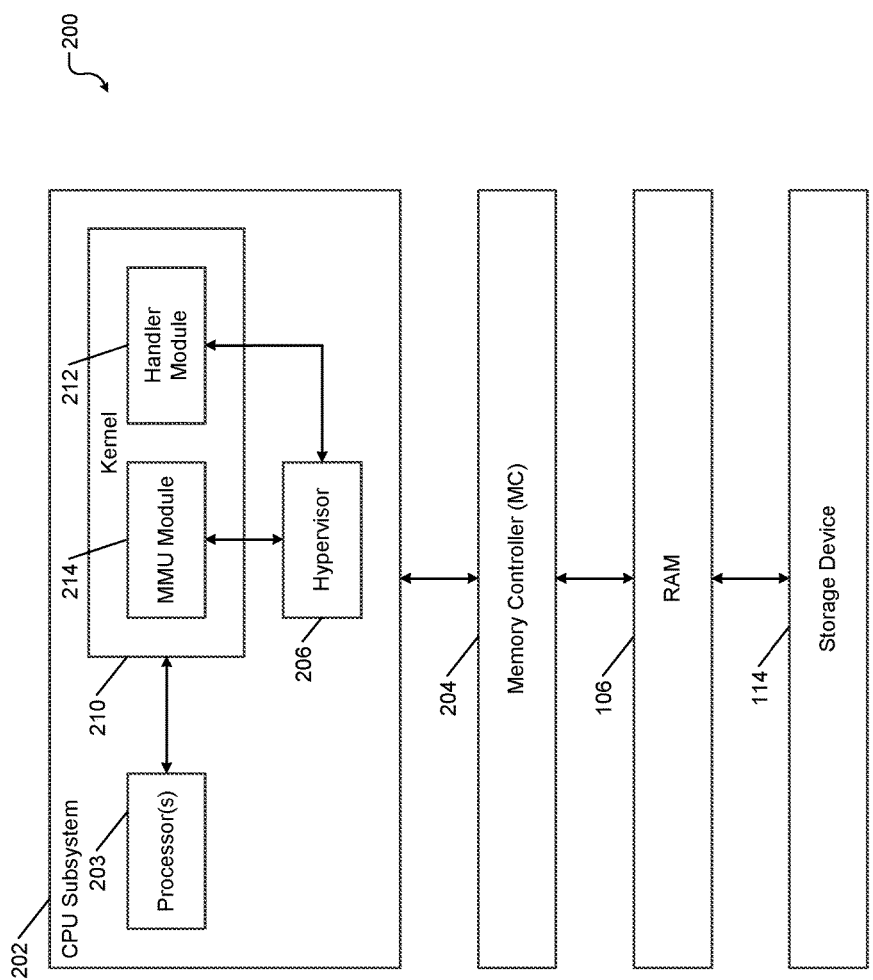
FIG. 4 is a simplified functional block diagram of the computing system of FIG. 3.
Figure 5A:
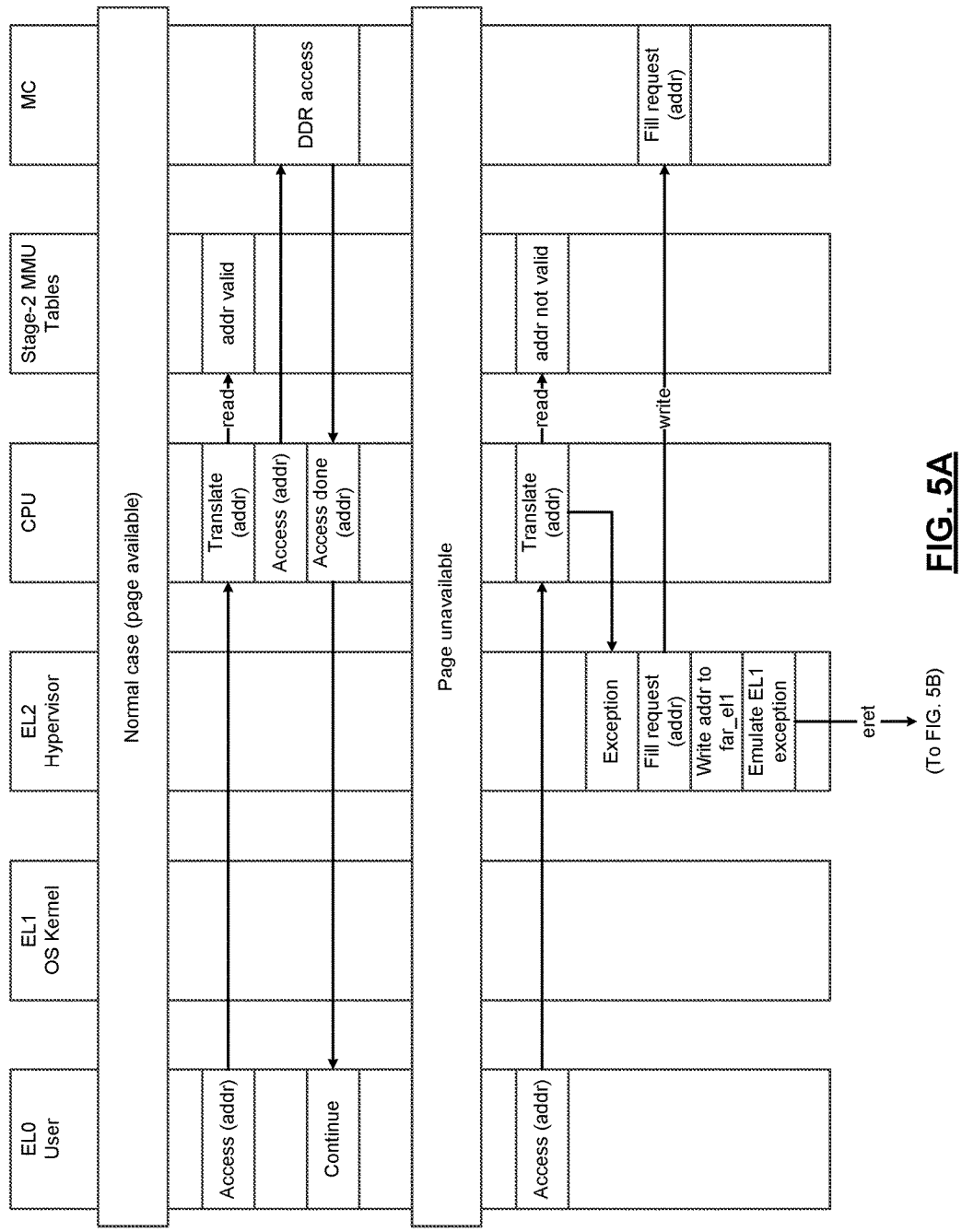
Figure 5C:
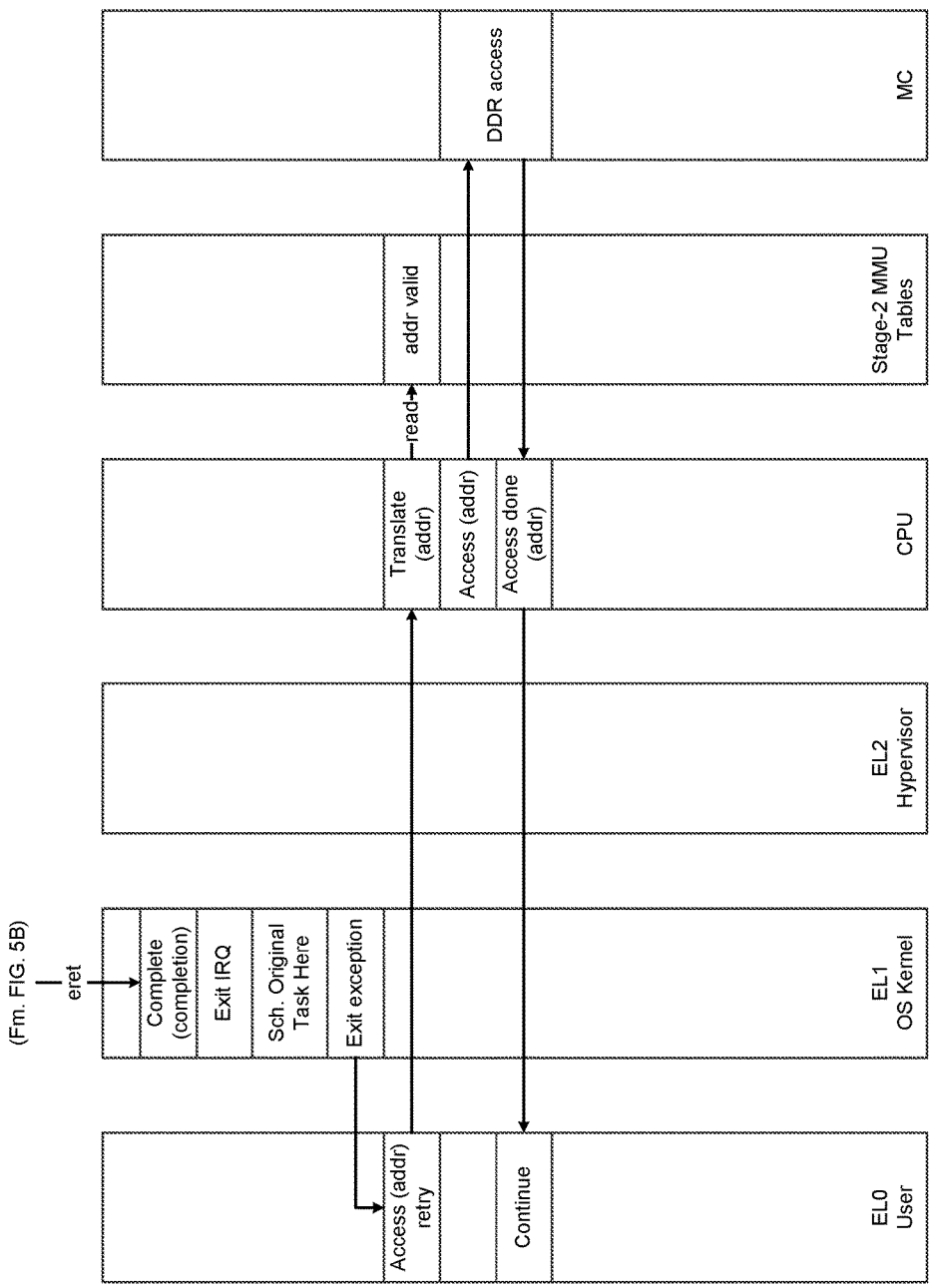

FIG. 4 shows a simplified functional block diagram of the system 200. The system 200 includes the CPU subsystem 202, the memory controller 204, the RAM 106, and the storage device 114. The CPU subsystem 202 includes one or more processors 203, the hypervisor 206, and the OS kernel 210 including the handler 212 and a memory management (MMU) module 214. The MMU module 214 maintains the stage-2 MMU tables that are updated by the hypervisor 206. The system 200 performs fault handling on access to an unavailable page as shown in FIGS. 5A-5C and as described below.

Since pages that are unavailable are marked non-present in the stage-2 MMU tables, an access to any location within any such page results in a stage-2 fault exception handled by the hypervisor 206. The flow for handling a stage-2 fault exception is shown in FIGS. 5A-5C and is described below.

When the user process 112 or the OS kernel 210 accesses an unavailable page, a stage-2 fault occurs, which is handled by the hypervisor 206 as follows. The hypervisor 206 identifies the fault address (PA). The hypervisor 206 emulates (generates) an exception to notify the OS kernel 210 of the access fault. The exception appears as if the instruction that performed the faulted access to an unavailable page generated an OS kernel exception, similar to a regular fault exception taken to the OS kernel and handled by the OS memory management. Control returns from the hypervisor 206 to the handler 212 in the OS kernel 210.

The OS kernel 210 receives the emulated exception generated by the hypervisor 206, which enters the handler 212. The handler 212 is different from the agent of the OS kernel 110 shown in FIG. 2A, where the regular page fault is taken to the OS kernel 110 and is handled by the agent, which is part of the OS memory management in the OS kernel 110. The handler 212 identifies the physical address (PA) that caused the page fault. The handler 212 verifies whether the excepted thread execution can be suspended (is not atomic (critical)). If the excepted thread execution cannot be suspended, which is not typical, an error is reported or active waiting is implemented for the page to become available.

If the excepted thread execution can be suspended, the handler 212 queues a request object that identifies the PA of the page (more than one request from different threads to the same page can be waiting) and the thread execution that will be suspended (e.g., a completion object in Linux kernel). The handler 212 requests the page by writing to a register of the memory controller 204. The handler 212 suspends execution (e.g., a wait_for_completion in Linux kernel) until the page becomes available. The OS kernel 210 schedules other threads for execution on the processor 203 or idles the processor 203 for power saving while waiting for the page to become available. Once the suspended thread is resumed after the page becomes available, the exception handler exits, and the processor 203 resumes the execution of the code originally faulted.

The page state transitions are reflected in stage-2 MMU tables in the MMU module 214 as follows. The page state transitions are carried out by the memory controller 204. The hypervisor 206 is notified on these transitions using two interrupts described below.

Figure 6:
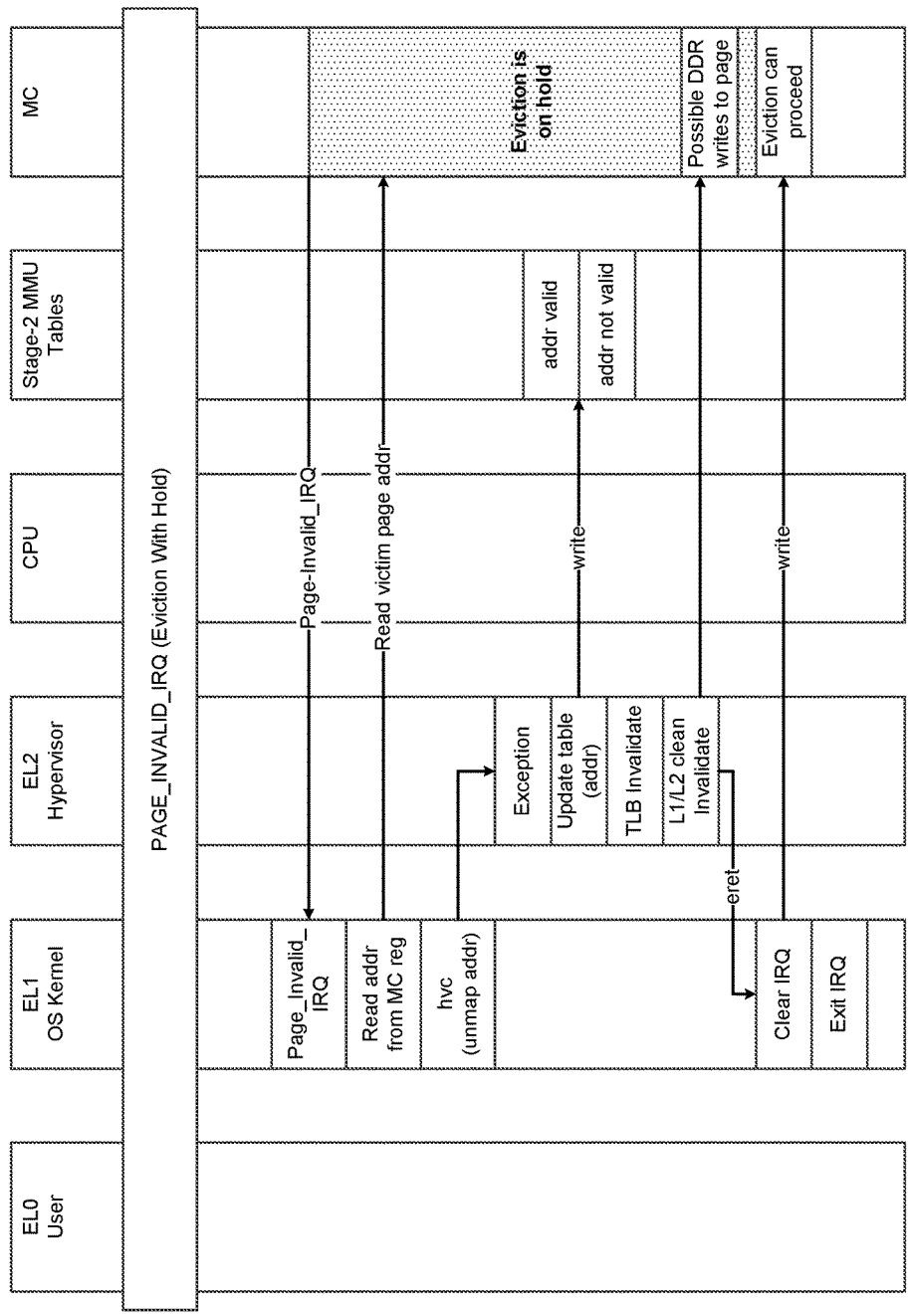
FIG. 6 depicts handling of an interrupt that is used to inform OS kernel when a page is going to become unavailable and that allows the hypervisor of FIG. 4 to update page status and perform housekeeping before the page becomes unavailable.

FIG. 6 shows a first interrupt, PAGE_INVALID IRQ, that informs the OS kernel software when a page is going to become unavailable. The first interrupt allows the hypervisor 206 to update the state-2 tables and perform housekeeping before the page becomes unavailable as follows.

An IRQ handler in the OS kernel 210 invokes a hypervisor call (HVC) while the page eviction is on hold. The hypervisor 206 handles the hypervisor call as follows. The cache/fib operations are described below in terms of ARMv8 instructions for example only. The hypervisor 206 reads the page address (PA) from a register in the memory controller 204. The hypervisor 206 sets the stage-2 table entries for the PA to indicate that the page is not present (not available). The hypervisor 206 invalidates the translation lookaside buffer (TLB) to ensure that the stage-2 table entries modified above take effect for all processors 203. The hypervisor 206 cleans/invalidates processor caches that may subsequently require the PA. The hypervisor 206 acknowledges the event by writing to a register of the memory controller 204. At this point, the memory controller 204 can proceed with evicting the page as no more accesses from any processor 203 to this page are possible.

A second interrupt, PAGE_VALID IRQ, informs the OS kernel software that a page has become available and allows the hypervisor 206 to update the stage-2 tables as follows. The IRQ handler in the OS kernel 210 invokes a hypervisor call (HVC). The hypervisor 206 handles the hypervisor call as follows. The hypervisor 206 reads the page address (PA) from a register in the memory controller 204. The hypervisor 206 populates the stage 2 table entries (sets the entries to indicate that the page is present (available)). The IRQ handler in the OS kernel 210 looks up the PA in the queue of requests currently waiting and for each one resumes execution of the relevant thread (e.g., complete in Linux kernel).

Figure 7:
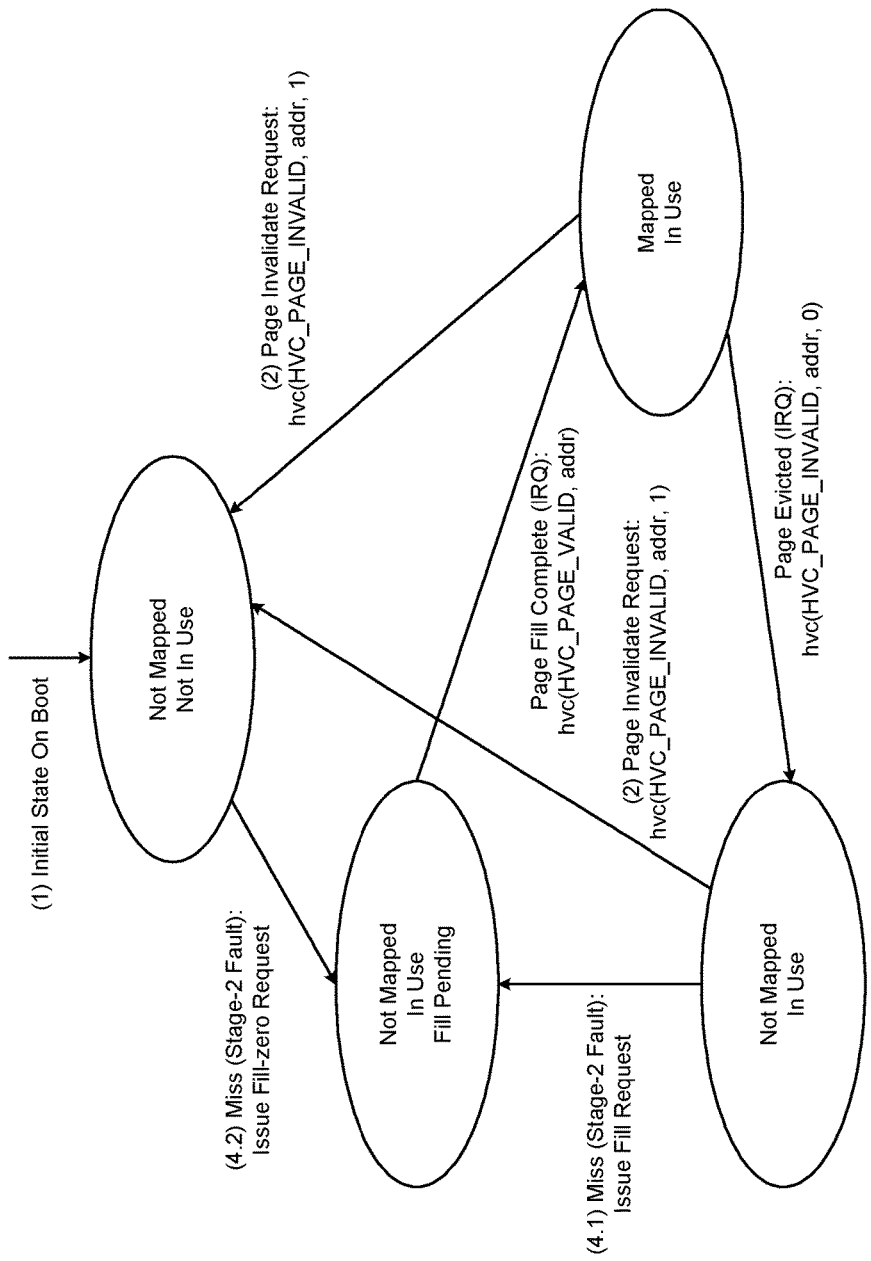
FIG. 7 shows a state diagram of a page state tracking system.

FIG. 7 shows an additional page state tracking system, where a page can be further identified as being in use or not in use depending whether the page includes valid data or irrelevant data, respectively. This information can be stored in the form of additional bits in the stage-2 tables. Accordingly, an unavailable, not in use page can be made available without reading page contents from the storage device 114 into the RAM 106 since the page stores irrelevant data. This additional page tracking system is explained below.

The externally managed RAM 106 that implements swap of the page contents to the slower storage device 114 incurs a long access time when the page transitions from an unavailable state to an available state due to two reasons: (a) Another available page might have to be evicted, which may require writing the content of that page from the RAM 106 into the slower storage device 114 (a.k.a. dirty eviction). (b) The requested page content has to be read from the slower storage device 114 into the RAM 106.

The memory controller 204 may not be able to store the state of all the "virtual pages" due to size constraints. Accordingly, while the memory controller 204 can "invalidate" a page, this only affects present pages, and the information about a page being in an invalid state is lost once the page is evicted. Consequently, further access to this page (resulting in a miss) will cause a read from the slower storage device 114.

To eliminate (b) when possible, the page state tracking can be implemented with the following additional state information stored by the Hypervisor 206, e.g., in the stage-2 table descriptors (using bits reserved for software use): an "in use" page holds valid content, while a "not in use" page content is irrelevant. In FIG. 7, transitions described below using identifiers (1), (2), (4.1) and (4.2) are shown using the same identifiers. Identifier (3) described below is not a transition and is therefore not shown in FIG. 7.

(1) Initially, at power up, the content of the RAM 106 is irrelevant, and therefore all the pages of the RAM 106 are initially considered to be in "not in use" state. (2) When a page is freed (deallocated) by the OS memory management, the freed page is marked "not in use" and is made unavailable, i.e., stage-2 mapping is made invalid, and "invalidate" request is issued to the memory controller 204. (3) Page allocation by the OS memory management does not have to be tracked because the first access to the page will result in a stage-2 fault due to (2). (4) When an actual page access results in a stage-2 fault, the page tracking state is examined. (4.1) If the page is "in use", a page fill request to the memory controller 204 is issued, which incurs the latency (b) described above. (4.2) Otherwise, i.e., if the page is "not in use", a "no fill" request to the memory controller 204 is issued, which eliminates the latency (b) described above since the memory controller 204 simply fills the page with null data (e.g., all zeros) instead of fetching the page from the slower storage device 114 and makes the page available.

Figure 8:
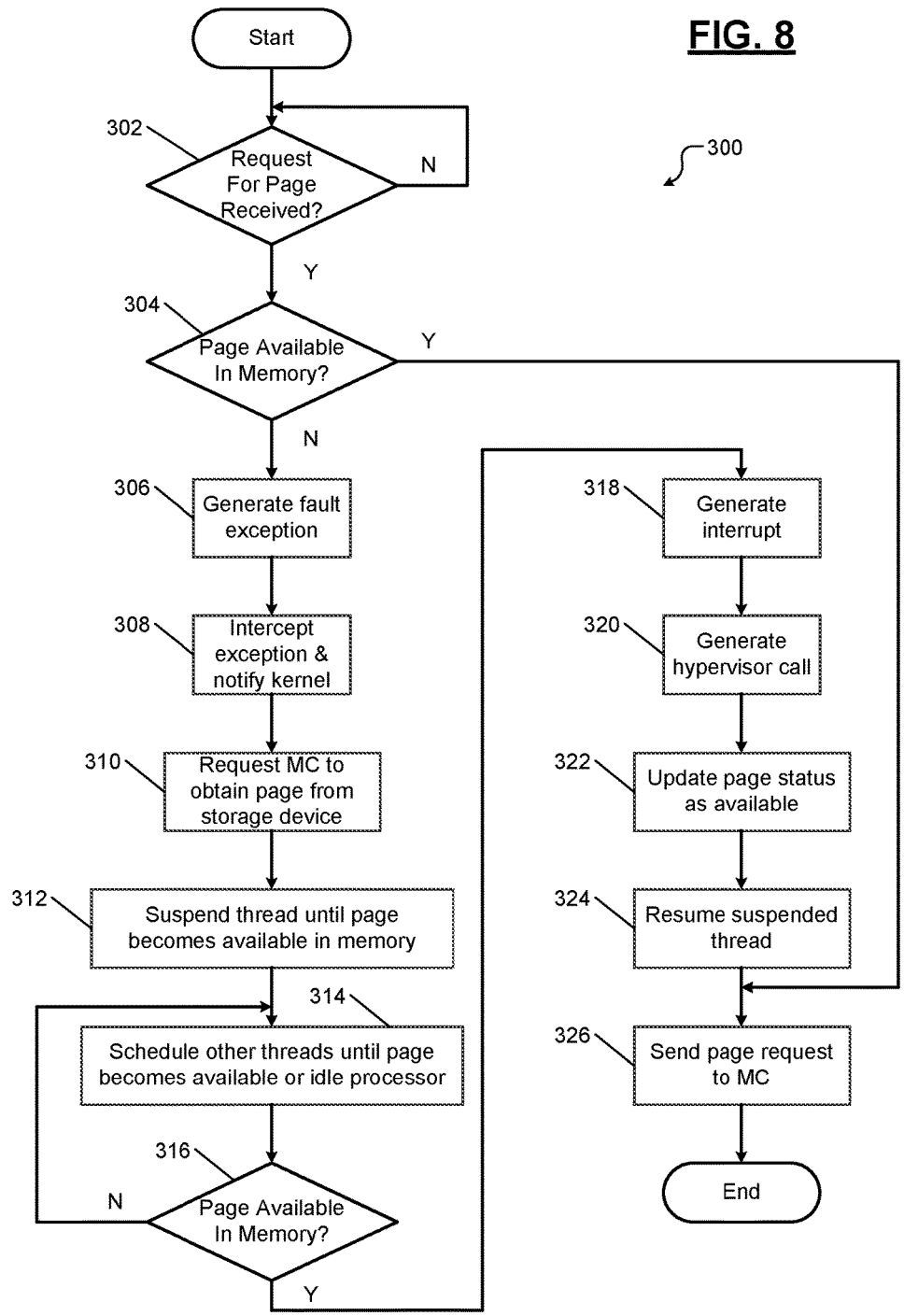
FIG. 8 is a flowchart of a method for controlling CPU access to an externally managed physical memory using a hypervisor.

FIG. 8 shows a method 300 for controlling CPU access to externally managed physical memory using a hypervisor, according to an embodiment. At 302, control determines whether a thread being executed by a processor requests a page of the physical memory (RAM). For example, the MMU module 214 determines whether a thread being executed by the processor 203 requests a page of the physical memory (RAM) 106. At 304, if a thread being executed by a processor requests a page of the physical memory, control determines whether the page is available in the physical memory by checking page status in stage-2 translation table. For example, if a thread being executed by the processor 203 requests a page of the physical memory (RAM) 106, the MMU module 214 determines whether the page is available in the physical memory (RAM) 106 by checking page status in stage-2 translation table. At 326, if the page is available in the physical memory, control sends a request for the page to the memory controller. For example, if the page is available in the physical memory (RAM) 106, the MMU module 214 sends a request for the page to the memory controller (MC) 204.

At 306, if the page is not available in the physical memory, control generates a fault exception. For example, if the page is not available in the physical memory (RAM) 106, the MMU module 214 generates a fault exception. At 308, control intercepts the fault exception using the hypervisor and notifies the OS kernel of the fault exception. For example, the hypervisor 206 intercepts the fault exception and notifies the OS kernel 210 of the fault exception. At 310, control requests the memory controller to obtain the page from a storage device if the page is in use; or if the page is not in use, control waits for the page to become available after the memory controller fills the page with null data. For example, the handler module 212 requests the memory controller (MC) 204 to obtain the page from the storage device 114 if the page is in use; or if the page is not in use, the handler module 212 waits for the page to become available after the memory controller (MC) 204 fills the page with null data. At 312, control suspends the thread until the page becomes available in the physical memory. For example, the handler module 212 suspends the thread until the page becomes available in the physical memory (RAM) 106. At 314, until the page becomes available in the physical memory, control switches the processor to an idle mode to save power or schedules other threads for execution by the processor. For example, until the page becomes available in the physical memory (RAM) 106, the OS kernel 210 switches the processor 203 to an idle mode to save power or schedules other threads for execution by the processor 203.

At 316, control determines whether the page has become available in the physical memory. For example, the MMU module 214 determines whether the page has become available in the physical memory (RAM) 106. Control returns to 314 if the page has not yet become available in the physical memory. At 318, if the page has become available in the physical memory, control generates an interrupt. For example, if the page has become available in the physical memory (RAM) 106, the memory controller (MC) 204 generates an interrupt. At 320, control generates a hypervisor call. For example, the OS kernel 210 generates a hypervisor call. At 322, control updates the page status as being available using the hypervisor. For example, the hypervisor 206 updates the page status as being available. At 324, control resumes execution of the suspended thread. For example, the OS kernel 210 resumes execution of the suspended thread. At 326, control sends a request for the page to the memory controller. For example, the OS kernel 210 sends a request for the page to the memory controller (MC) 204.

Figure 9:
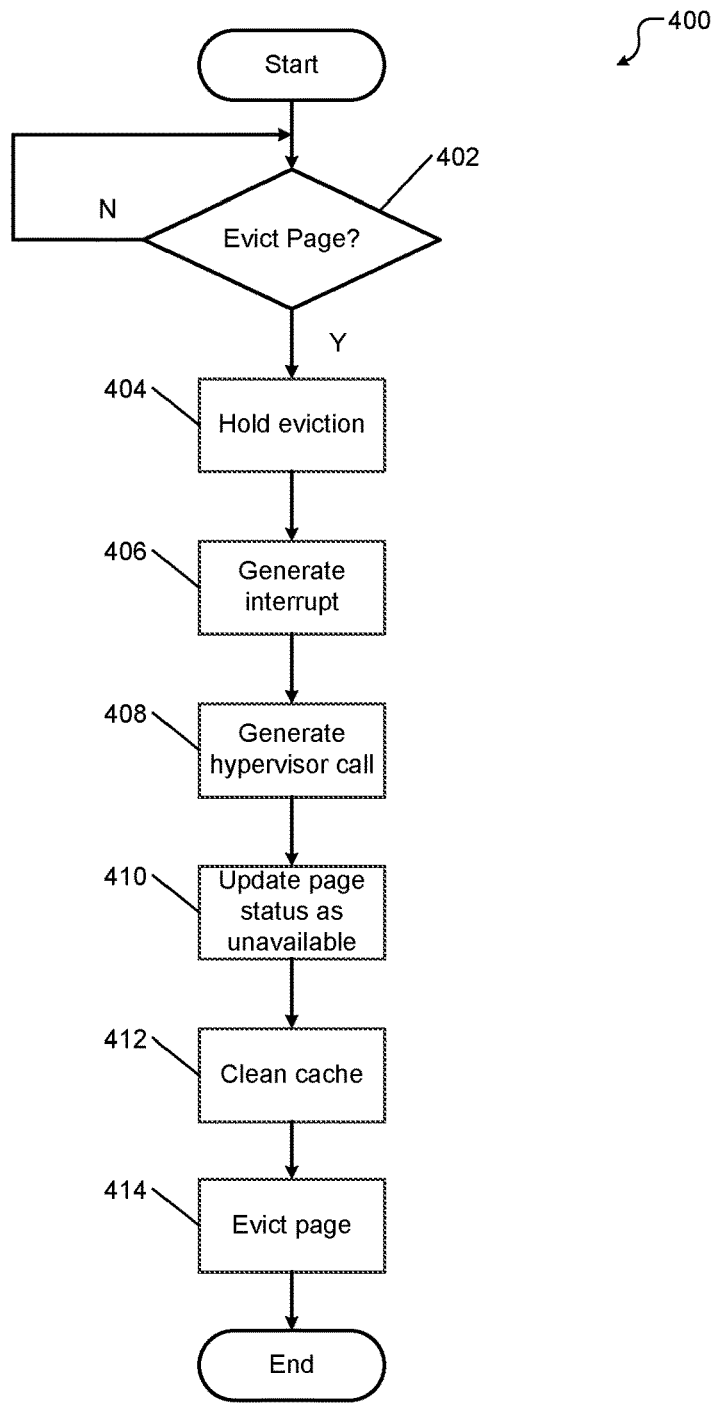
FIG. 9 is a flowchart of a method for updating page status as being unavailable before evicting a page.

FIG. 9 shows a method 400 for updating the page status as being unavailable before evicting a page, according to an embodiment. At 402, control determines whether to evict a page. For example, the memory controller (MC) 204 determines whether to evict a page. At 404, if control determines to evict a page, control holds the eviction of the page. For example, if the memory controller (MC) 204 determines to evict a page, the memory controller (MC) 204 holds the eviction of the page. At 406, control generates an interrupt. For example, the memory controller (MC) 204 generates an interrupt. At 408, control generates a hypervisor call. For example, the OS kernel 210 generates a hypervisor call. At 410, control updates the page status as being unavailable using the hypervisor. For example, the hypervisor 206 updates the page status as being unavailable. At 412, control cleans processor cache(s) that may subsequently request the page being evicted. For example, the hypervisor 206 cleans processor cache(s) that may subsequently request the page being evicted. At 414, control evicts the page. For example, the memory controller (MC) 204 evicts the page.

In summary, the systems and methods described above with reference to FIGS. 3-9 allow controlled access to the externally managed RAM by CPU's and thus prevent or minimize impact of the long latency accesses to such RAM on system performance and power consumption. The systems and methods prevent CPU's from directly accessing the pages that are unavailable. Instead, the pages are requested from the memory controller via control channel, which eliminates stalling of the CPU's on such accesses. The systems and methods allow the OS kernel to suspend threads that issued an access to an unavailable page until the page becomes available. The systems and methods ensure that no CPU caches have dirty content that map to unavailable pages. The systems and methods allow inexpensive tracking of page use to further reduce latencies when making the page available. This is done transparently to the OS kernel memory management and does not require modifications to it except for interception of page free operation.

From FIGS. 3-6, functions of the memory management module are distributed between memory management portion of CPU hardware (e.g., stage-2 MMU translation) and memory management portion of OS kernel. For example, the functions of the memory management module performed by the memory management portion of CPU hardware (e.g., stage-2 MMU translation) include: receiving a request to access a page in the memory; sending the request to the memory controller controlling the memory if the page is available in the memory; and if the page is unavailable in the memory, (i) not sending the request to the memory controller, and (ii) generating the exception intercepted by the hypervisor. For example, the functions of the memory management module performed by the memory management portion of OS kernel include page deallocation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. The functionality of any given module of the present disclosure may be distributed among multiple modules that are connected via interface circuits.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a memory management module to
      receive a request to access a page in a memory,
      in response to the page being available in the memory, send the request to a memory controller controlling the memory, and
      in response to the page being unavailable in the memory, (i) not send the request to the memory controller, and (ii) generate a first exception, and
   a hypervisor to intercept the first exception and send a second exception to an operating system,
   wherein the operating system includes
      a handler to
         in response to the second exception, selectively request the memory controller to obtain the page from a storage device into the memory, and
         suspend execution of a first thread issuing the request on a processor until the page becomes available in the memory; and
      a kernel to
         schedule execution of a second thread on the processor until the page becomes available, or
         idle the processor until the page becomes available;
   wherein:
   the memory controller is further to generate an interrupt prior to evicting a second page from the memory to the storage device;
   in response to the interrupt, the kernel is further to generate a hypervisor call;
   in response to the hypervisor call, prior to the second page becoming unavailable, the hypervisor is further to:
      update status of the second page as being unavailable; and
      clean a cache of the processor to obviate access to the second page after the second page becomes unavailable.

2. The system of claim 1, wherein:
   in response to the page becoming available in the memory, the memory controller is further to generate a second interrupt;
   in response to the second interrupt, the kernel is further to generate a second hypervisor call;

in response to the second hypervisor call, the hypervisor is further to update status of the page as being available; and in response to the updated status of the page indicating the page is available, the kernel is further to resume execution of the first thread issuing the request; and the memory management module is further to send the request to the memory controller.

3. The system of claim 1, wherein the handler is further to:

request the memory controller to obtain the page from the storage device into the memory in response to the page storing valid data; and not request the memory controller to obtain the page from the storage device into the memory in response to the page storing irrelevant data.

4. The system of claim 3, wherein in response to the page storing irrelevant data, the memory controller is further to make the page available by populating the page with null data.

5. The system of claim 1, wherein in response to the memory management module deallocating a third page, the hypervisor is further to designate the third page (i) as being unavailable and (ii) as storing data not in use.

6. The system of claim 5, wherein in response to the hypervisor designating the second page as storing data not in use, the memory controller is further to not evict the second page from the memory to the storage device.

7. A method comprising:

receiving, by a memory management module, a request to access a page in a memory;

sending, by the memory management module, the request to a memory controller controlling the memory in response to the page being available in the memory;

in response to the page being unavailable in the memory, (i) not sending, by the memory management module, the request to the memory controller and (ii) generating, by the memory management module, a first exception;

intercepting, by a hypervisor, the first exception and sending, by the hypervisor, a second exception from the hypervisor to an operating system;

in response to the second exception, selectively requesting, by a handler of an operating system, the memory controller to obtain the page from a storage device into the memory and suspending, by the handler, execution of a first thread issuing the request on a processor until the page becomes available in the memory;

scheduling, by a kernel of the operating system, execution of a second thread on the processor until the page becomes available or idling, by the kernel, the processor until the page becomes available;

generating, by the memory controller, an interrupt prior to evicting a second page from the memory to the storage device;

generating, by the kernel, a hypervisor call in response to the interrupt; and in response to the hypervisor call, prior to the second page becoming unavailable, updating, by the hypervisor, status of the second page as being unavailable and cleaning, by the hypervisor, a cache of the processor to obviate access to the second page after the second page becomes unavailable.

8. The method of claim 7, further comprising:

generating, by the memory controller, a second interrupt in response to the page becoming available in the memory;

generating, by the kernel, a second hypervisor call in response to the second interrupt;

updating, by the hypervisor, status of the page as being available in response to the second hypervisor call; and in response to the updated status of the page indicating the page is available, resuming, by the kernel, execution of the first thread issuing the request and sending, by the memory management module, the request to the memory controller.

9. The method of claim 7, further comprising:

requesting, by the handler, the memory controller to obtain the page from the storage device into the memory in response to the page storing valid data; and not requesting, by the handler, the memory controller to obtain the page from the storage device into the memory in response to the page storing irrelevant data.

10. The method of claim 9, further comprising making, by the memory controller, the page available by populating the page with null data in response to the page storing irrelevant data.

11. The method of claim 7, further comprising designating, by the hypervisor, in response to the memory management module deallocating a third page, the third page (i) as being unavailable and (ii) as storing data not in use.

12. The method of claim 11, further comprising:

in response to designating, by the hypervisor, the second page as storing data not in use, not evicting, by the memory controller, the second page from the memory to the storage device.

* * * * *